United States Patent [19]
Oz

[11] Patent Number: 5,450,098
[45] Date of Patent: * Sep. 12, 1995

[54] TRI-DIMENSIONAL VISUAL MODEL

[75] Inventor: Ran Oz, Herzliya, Israel

[73] Assignee: Optibase Advanced Systems (1990) Ltd., Herzliya, Israel

[*] Notice: The portion of the term of this patent subsequent to Aug. 22, 2012 has been disclaimed.

[21] Appl. No.: 856,140

[22] Filed: Sep. 19, 1992

[51] Int. Cl.⁶ .................................................. G09G 1/28
[52] U.S. Cl. ...................................... 345/154; 345/199
[58] Field of Search ............... 340/701, 703, 728, 731, 340/793, 812; 358/75, 80, 81, 461, 463, 456, 455, 457; 345/136, 137, 199, 138, 154, 148, 149

[56] References Cited

U.S. PATENT DOCUMENTS

| | | | |
|---|---|---|---|
| 4,894,776 | 1/1990 | Dekel | 340/728 |
| 4,897,799 | 1/1990 | Le Gall et al. | 358/11 |
| 5,025,394 | 6/1991 | Parke | 345/138 |
| 5,040,128 | 8/1991 | Yamaguchi | 340/703 |
| 5,054,100 | 10/1991 | Tai | 382/22 |
| 5,068,644 | 11/1991 | Batson et al. | 340/701 |
| 5,124,688 | 6/1992 | Rumball | 340/799 |
| 5,142,272 | 8/1992 | Kondo | 340/701 |
| 5,172,247 | 12/1992 | Ghaderi | 358/456 |
| 5,181,014 | 1/1993 | Dalrymple et al. | 340/799 |
| 5,204,665 | 4/1993 | Bollman et al. | 358/80 |
| 5,218,350 | 6/1993 | Bollman et al. | 340/728 |

*Primary Examiner*—Tommy P. Chin
*Assistant Examiner*—A. Au
*Attorney, Agent, or Firm*—Blakely, Sokoloff, Taylor & Zafman

[57] ABSTRACT

A system and method for converting moving video images to a format used by graphics display boards which is based on a pseudo-color method (i.e., displays such as Super VGA used by IBM personal computers and compatibles capable of displaying only 256 colors wherein the resulting visual model emulates thousands of colors displaying richly colored images and delivering a much better result than technologies based on currently used techniques such as the common histogram method. An error factor is determined for each pixel in a frame and a portion of the error is diffused among the neighboring pixels and the corresponding pixel in the next frame. A selection process specifies a universal palette which contains an optimum set of colors for all images, i.e., without using a histogram which determines the colors which appear most frequently in a single particular image.

6 Claims, 5 Drawing Sheets

NEXT FRAME

CURRENT FRAME

Fig. 1a

PRIOR ART

Fig. 1b

| K=20..78 | | | K=79..137 | | | K=138..196 | | | K=197..255 | | |
|---|---|---|---|---|---|---|---|---|---|---|---|
| R = | G = | B = | R = | G = | B = | R = | G = | B = | R = | G = | B = |
| 18 | 33 | 56 | 129 | 41 | 61 | 172 | 120 | 147 | 215 | 199 | 232 |
| 39 | 23 | 56 | 82 | 102 | 141 | 193 | 109 | 147 | 236 | 188 | 232 |
| 60 | 12 | 56 | 103 | 91 | 141 | 130 | 137 | 126 | 255 | 177 | 232 |
| 81 | 1 | 56 | 124 | 80 | 141 | 151 | 126 | 126 | 194 | 205 | 211 |
| 18 | 29 | 35 | 145 | 69 | 141 | 172 | 116 | 126 | 215 | 195 | 211 |
| 39 | 19 | 35 | 82 | 97 | 120 | 193 | 105 | 126 | 236 | 184 | 211 |
| 60 | 8 | 35 | 103 | 87 | 120 | 146 | 166 | 205 | 255 | 173 | 211 |
| 81 | 0 | 35 | 124 | 76 | 120 | 167 | 155 | 205 | 194 | 201 | 190 |
| 18 | 25 | 13 | 145 | 65 | 120 | 188 | 144 | 205 | 215 | 190 | 190 |
| 39 | 14 | 13 | 82 | 93 | 99 | 209 | 133 | 205 | 236 | 180 | 190 |
| 60 | 4 | 13 | 103 | 83 | 99 | 146 | 161 | 184 | 255 | 169 | 190 |
| 81 | 0 | 13 | 124 | 72 | 99 | 167 | 151 | 184 | 210 | 230 | 255 |
| 34 | 54 | 93 | 145 | 61 | 99 | 188 | 140 | 184 | 231 | 219 | 255 |
| 55 | 43 | 93 | 82 | 89 | 77 | 209 | 129 | 184 | 252 | 208 | 255 |
| 76 | 32 | 93 | 103 | 78 | 77 | 146 | 157 | 163 | 255 | 197 | 255 |
| 97 | 21 | 93 | 124 | 68 | 77 | 167 | 147 | 163 | 210 | 225 | 248 |
| 34 | 49 | 72 | 145 | 57 | 77 | 188 | 136 | 163 | 231 | 215 | 248 |
| 55 | 39 | 72 | 98 | 118 | 157 | 209 | 125 | 163 | 252 | 204 | 248 |
| 76 | 28 | 72 | 119 | 107 | 157 | 146 | 153 | 142 | 255 | 193 | 248 |
| 97 | 17 | 72 | 140 | 96 | 157 | 167 | 142 | 142 | 210 | 221 | 227 |
| 34 | 45 | 51 | 161 | 85 | 157 | 188 | 132 | 142 | 231 | 211 | 227 |
| 55 | 35 | 51 | 98 | 113 | 136 | 209 | 121 | 142 | 252 | 200 | 227 |
| 76 | 24 | 51 | 119 | 103 | 136 | 162 | 182 | 221 | 255 | 189 | 227 |
| 97 | 13 | 51 | 140 | 92 | 136 | 183 | 171 | 221 | 210 | 217 | 206 |
| 34 | 41 | 29 | 161 | 81 | 136 | 204 | 160 | 221 | 231 | 206 | 206 |
| 55 | 30 | 29 | 98 | 109 | 115 | 225 | 149 | 221 | 252 | 196 | 206 |
| 76 | 20 | 29 | 119 | 99 | 115 | 162 | 177 | 200 | 255 | 185 | 206 |
| 97 | 9 | 29 | 140 | 88 | 115 | 183 | 167 | 200 | 226 | 246 | 255 |
| 50 | 70 | 109 | 161 | 77 | 115 | 204 | 156 | 200 | 247 | 235 | 255 |
| 71 | 59 | 109 | 98 | 105 | 93 | 225 | 145 | 200 | 255 | 224 | 255 |
| 92 | 48 | 109 | 119 | 94 | 93 | 162 | 173 | 179 | 255 | 213 | 255 |
| 113 | 37 | 109 | 140 | 84 | 93 | 183 | 163 | 179 | 226 | 241 | 255 |
| 50 | 65 | 88 | 161 | 73 | 93 | 204 | 152 | 179 | 247 | 231 | 255 |
| 71 | 55 | 88 | 114 | 134 | 173 | 225 | 141 | 179 | 255 | 220 | 255 |
| 92 | 44 | 88 | 135 | 123 | 173 | 162 | 169 | 158 | 255 | 209 | 255 |
| 113 | 33 | 88 | 156 | 112 | 173 | 183 | 158 | 158 | 226 | 237 | 243 |
| 50 | 61 | 67 | 177 | 101 | 173 | 204 | 148 | 158 | 247 | 227 | 243 |
| 71 | 51 | 67 | 114 | 129 | 152 | 225 | 137 | 158 | 255 | 216 | 243 |
| 92 | 40 | 67 | 135 | 119 | 152 | 178 | 198 | 237 | 255 | 205 | 243 |
| 113 | 29 | 67 | 156 | 108 | 152 | 199 | 187 | 237 | 226 | 233 | 222 |
| 50 | 57 | 45 | 177 | 97 | 152 | 220 | 176 | 237 | 247 | 222 | 222 |
| 71 | 46 | 45 | 114 | 125 | 131 | 241 | 165 | 237 | 255 | 212 | 222 |
| 92 | 36 | 45 | 135 | 115 | 131 | 178 | 193 | 216 | 255 | 201 | 222 |
| 113 | 25 | 45 | 156 | 104 | 131 | 199 | 183 | 216 | 242 | 255 | 255 |
| 66 | 86 | 125 | 177 | 93 | 131 | 220 | 172 | 216 | 255 | 251 | 255 |
| 87 | 75 | 125 | 114 | 121 | 109 | 241 | 161 | 216 | 255 | 240 | 255 |
| 108 | 64 | 125 | 135 | 110 | 109 | 178 | 189 | 195 | 255 | 229 | 255 |
| 129 | 53 | 125 | 156 | 100 | 110 | 199 | 179 | 195 | 242 | 255 | 255 |
| 66 | 81 | 104 | 177 | 89 | 110 | 220 | 168 | 195 | 255 | 247 | 255 |
| 87 | 71 | 104 | 130 | 150 | 189 | 241 | 157 | 195 | 255 | 236 | 255 |
| 108 | 60 | 104 | 151 | 139 | 189 | 178 | 185 | 174 | 255 | 225 | 255 |
| 129 | 49 | 104 | 172 | 128 | 189 | 199 | 174 | 174 | 242 | 253 | 255 |
| 66 | 77 | 83 | 193 | 117 | 189 | 220 | 164 | 174 | 255 | 243 | 255 |
| 87 | 67 | 83 | 130 | 145 | 168 | 241 | 153 | 174 | 255 | 232 | 255 |
| 108 | 56 | 83 | 151 | 135 | 168 | 194 | 214 | 253 | 255 | 221 | 255 |
| 129 | 45 | 83 | 172 | 124 | 168 | 215 | 203 | 253 | 242 | 249 | 238 |
| 66 | 73 | 61 | 193 | 113 | 168 | 236 | 192 | 253 | 255 | 238 | 238 |
| 87 | 62 | 61 | 130 | 141 | 147 | 255 | 181 | 253 | 255 | 228 | 238 |
| 108 | 52 | 61 | 151 | 131 | 147 | 194 | 209 | 232 | 255 | 217 | 238 |

TRI-DIMENSIONAL VISUAL MODEL

BACKGROUND OF THE INVENTION

Figure 1A:
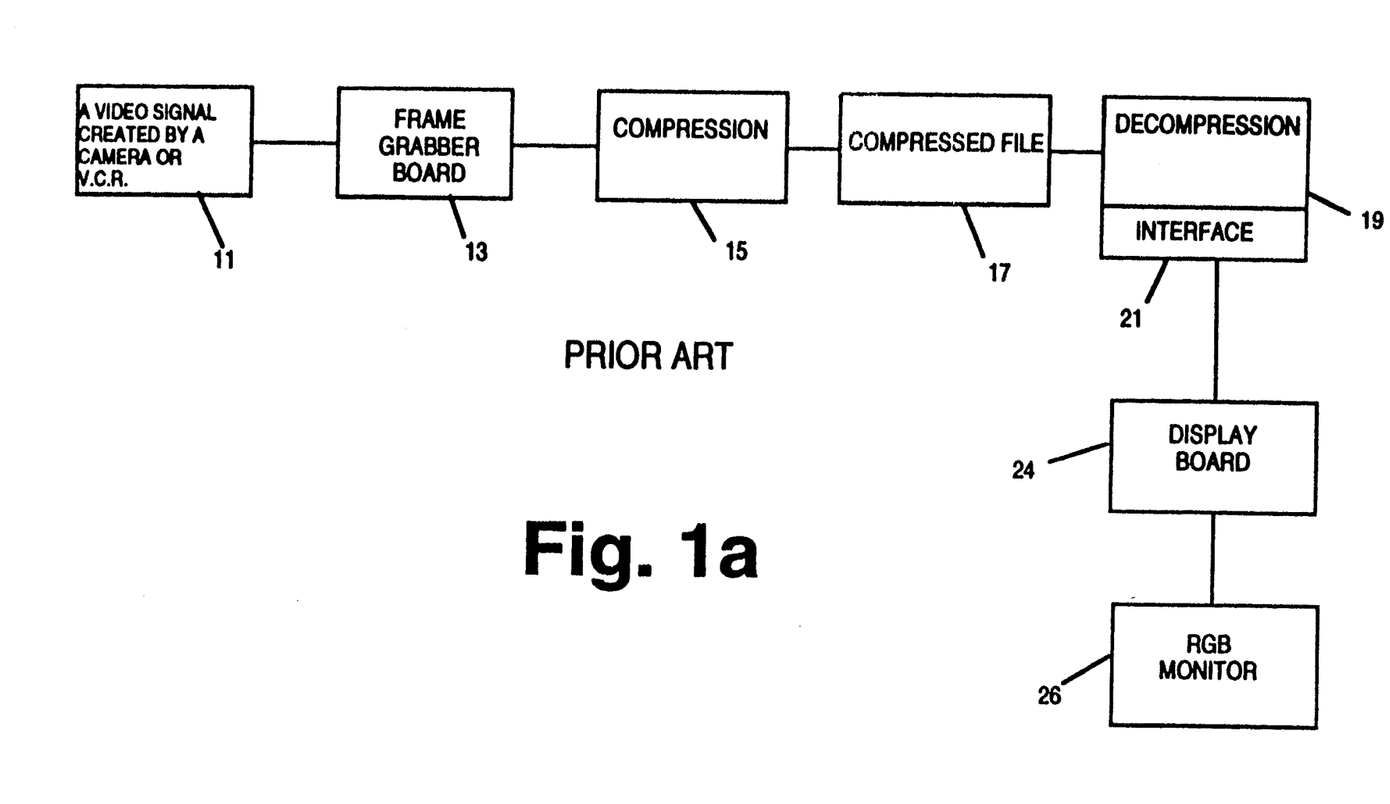
FIG. 1a is a block overview diagram of a prior art system for converting a color analog moving image to a true color digitized image which is compressed, decompressed and displayed using a 24 bit card and RGB monitor.

The present invention is directed to the processing of digitized true color information wherein each pixel to be displayed is represented by three color planes (red, blue and green) with each plane having 8 bits for 24 bits systems or 5 bits for 16 bit systems. Referring to FIG. 1a, the video signal created by a camera or a VCR 11, which is a moving video image at e.g., 30 frames per second for NTSC or 25 frames per second for PAL is digitized, using a frame grabber 13. The digitized true color images may then be compressed 15 according to a compression algorithm, e.g., the MPEG standard for moving images, into a compressed file reduced up to 200 to 1 by MPEG and stored as a file 17 for later processing. If the captured moving video image is compressed, it must first be decompressed 19 for further processing. In the prior art, the image is passed by interface 21 to a 16 bit or 24 bit display board 24 directly connected to interface 21 which processes the signal and displays it on an RGB monitor 26. The specifics of interface 21 depend upon the 16 or 24 bit display board utilized, the details of which are well known to persons skilled in the field of the invention. It is possible to display true color moving images using an interface 21 and display board 24. However, 16 or 24 bit display boards and RGB monitors are expensive and require relatively high speed data transfers.

A still digital image is formed by a large number of pixel lines forming a matrix of rows and columns where each element is a pixel. A sequence of moving pictures is a large number of still digital images that are displayed in very rapid succession, typically 25 or 30 frames per second.

The pixel value is a number that defines the color of the pixel, according to a dictionary known to the graphics display board.

The number of bits allocated to each of these values (the picture depth) directly determines the quality of the image. In other words, the more bits used to represent the pixel value, the larger the number of colors output simultaneously to the screen.

For example, if the depth of an image is a single bit, each pixel can have one of two values only —0 and 1. If, for instance, black is defined to be 0 and white is defined to be 1, as is the case for facsimile methodologies, only bi-level images can be produced.

Systems based on gray scale images, where the image depth is 8 bits, can display 256 levels of gray simultaneously, with 0 representing black and 255 ($FF_{16}$) representing white.

In systems based on true-color images, pictures consist of three spaces —R (red), G (green), B (blue) —where the depth of each is 8 bits (that is, each pixel is characterized by three 8-bit values), with 255 ($FF_{16}$) representing red, green or blue (or white if each of R, B and G is 255) and 0 representing no color (i.e., black if each of R, B and G is 0). The number of colors that can be simultaneously displayed in a 24 bit true color picture is $2^{24}$—some 16 million colors. In a 16 bit true color system wherein each of the three spaces R, B and G is represented by 5 bits, the total number of colors that can be displayed simultaneously is $2^{15}$ or some 33,000 colors.

Color images can also be displayed by another method known as the pseudo-color method. This method displays, for each pixel, a color from a reduced table or palette. Thus, instead of picking one from among approximately 16 million possible colors (24 bit systems) or 33,000 possible colors (16 bit systems), the pseudo color method allows choosing 256 colors from a much larger set of colors. However, the display (of an image, of a number of images or a moving picture sequence) is limited to 256 colors only. However, pseudo-color systems are much less expensive than true color systems. Additionally, with a pseudo color system, instead of requiring a high speed bus to transfer the data to a display device, pseudo color data may be sent over a standard AT bus having a bandwidth under 3 MBytes per second.

The prior art solution for converting a true color image to a pseudo color image is performing a statistical process on the image—called a histogram—that determines the 256 colors which most frequently appear in an image. Any other color in the picture is represented by one of these 256 possibilities. The histogram process determines, for each image, a table containing the 256 most frequently used colors.

The histogram method does not allow displaying more than one image at a time without affecting the image's optimal color table. This method is not capable of outputting a video sequence which displays a moving image of, for example, 25 or 30 images per second, each image having its own color, with currently available hardware since the histogram process requires switching color tables in the graphics board before display, a procedure that cannot be carried out fast enough to match the image succession (i.e., 25 or 30 times per second).

SUMMARY OF THE INVENTION

The present invention is a tri-dimensional visual model which converts true-color moving images to pseudo color images using a 256 color palette displays very high quality VGA format pictures. It accomplishes the high quality image by determining an error factor for each pixel in a frame and diffusing a portion of the error among the neighboring pixels and the corresponding pixel in the next frame. In a preferred embodiment, the method and apparatus for the conversion of images captured in true-color system (24 or 16 bits per pixel) to pseudo-color environments using just 256 colors utilizes a selection process which specifies a universal palette which contains an optimum set of colors for all images, i.e., without using a histogram which determines the colors which appear most frequently in a single particular image.

BRIEF DESCRIPTION OF THE DRAWINGS

FIG. 2 is a color table showing for RGB values from 20 to 255.

DETAILED DESCRIPTION OF THE INVENTION

The invented method is capable of displaying images —specifically, moving pictures—in pseudo-color systems, usable by Super VGA boards and the like.

Figure 1B:
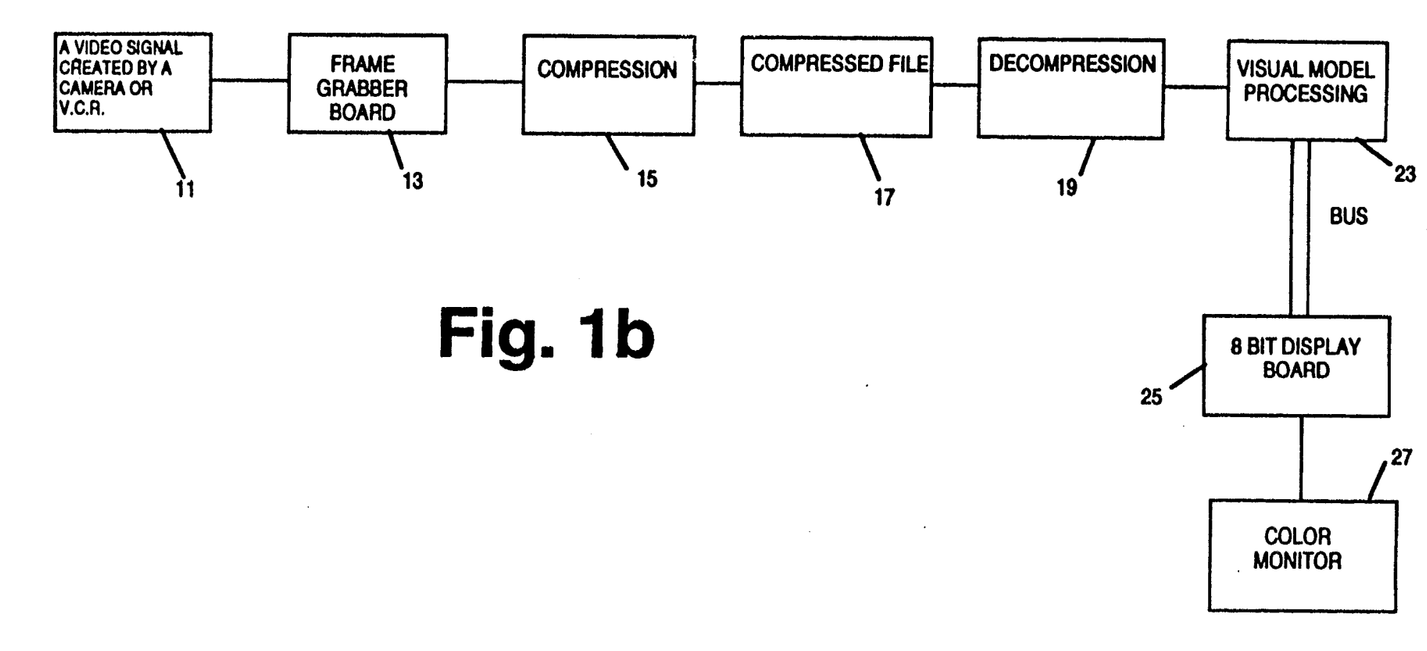
FIG. 1b is a block overview diagram of a system for converting a color analog still or moving image to a true color digitized image which is compressed, decompressed and displayed using an 8 bit display card and color monitor.
Figure 3:
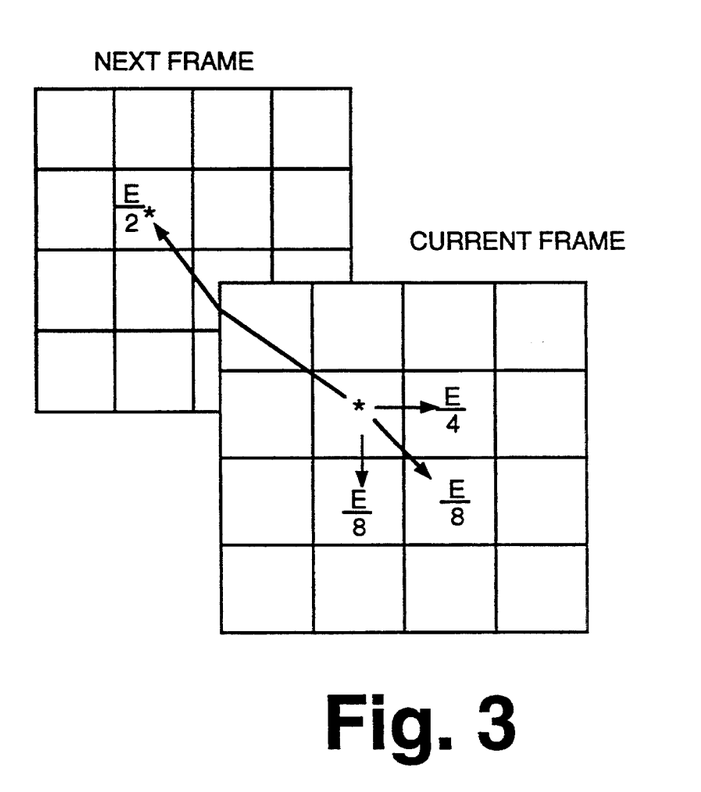
FIG. 3 is a pictorial representation of the processing used to calculate error diffusion for the tri-dimensional visual model.

FIG. 1b shows a system in which the present invention, represented by visual model processing block 23, is utilized. In the invented system, a pseudo color image moving at for example, 25 or 30 frames per second may be displayed using a standard bus, device or chip which has a bandwidth of less than 3 MBytes of digital data per second.

In a preferred embodiment, images are displayed through a single look-up table. That is, all of the images or image sequences are displayed through the same look-up table which is not changed during the output process. The single look-up table is independent of the displayed images or their type and, therefore, can be used to display a large number of different images simultaneously, thereby enabling the display of moving images having a size and resolution greater than is possible using prior art techniques.

The process includes adapting the image obtained from a color table so as to achieve excellent visual quality by applying an "error-diffusion" to the image. The error diffusion is carried out throughout the entire picture, pixel by pixel as described below.

The input is a moving true-color image. Each pixel is described by three numbers according to the color space it belongs to. The color space may be R, G, B or Y, U, V or Y, I, Q or any other format.

The output is an image where each pixel is defined by a color index from the 256 color palette which it represents wherein each pixel has an error diffusion factor applied to it.

The following is a detailed description of:
1. The selection process for obtaining the universal color palette.
2. The error-diffusion process for tri-dimensional error diffusion—moving pictures.

THE SELECTION PROCESS

In order to locate the optimal color table an orthogonal color space designated by the inventor as Y.I.P. is defined as follows:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

For the Y, U, V color space, the Y.I.Q. color space or other similar color space, Y, I, P is calculated in a similar manner which would be apparent to persons skilled in the art in view of the known mathematical relationships between such other color spaces and the RGB color space.

The conversion matrix above shows the valid range of possible Y.I.P. values for the R, G, B color space as follows:

1. $0 < Y < 255$ $[0 < R, G, B < 255]$
2. $-152 < I < 152$
3. $-64 < P < 133$

The valid range of possible Y, I, P values for the Y,U,V and Y, I, Q color spaces are determined from their respective color matrices.

One of the reasons that led to the selection of the Y.I.P. space is that only in this space it is possible to define a box, which includes all of the 256 colors which have been determined through simulation testing to yield optimal results. In general, acceptable results are obtained so long as each element of the conversion matrices defined above is approximately ±0.01 the values shown.

The dimensions of the box which includes the 256 colors are very significant. On one hand, it is important to define a box as large as possible to accommodate as many different colors as possible. On the other hand, it is important to define it small enough, to allow for the selection of the 256 most probable colors.

Another reason for choosing the Y.I.P. space is its orthogonality. This means each axis can be worked on independently without affecting the other two. This fact is of crucial importance in the error diffusion process which is explained below.

Simulations and checks on various image types have been performed, and a color box optimal to the human eye which contains the colors that appear most frequently in images has been determined. The colors that appear less frequently are truncated.

All colors that are excluded from the box are truncated and do not find expression in the selected palette.

The edges of the selected box are parallel to the edges of the Y.I.P. orthogonal space. The following segments define the box edges:

1. $0 < Y < 255$
2. $-96 < I < 96$
3. $-16 < P < 80$

The box which has been defined, although smaller than the entire Y.I.P. space, still contains an infinite number of colors. The next step is selecting the 256 colors from this box which constitute the invented look-up table.

Based on simulations and trials, the solution that has been determined to provide the best results is the following:

Divide the edge which is parallel to the Y axis into 16 segments.

Divide the edges that are parallel to the I and P components into four segments each.

By joining the lines that separate the segments, a division of the greater box into 256 smaller boxes is obtained, each containing an infinite number of colors. But only one color in each small box is selected to be a value in the invented look-up table—the center of each small box. That is, assume, for example, that the value to be determined is the small box at Y[0 ... 16), I[48 ... 96), P[−16 ... 8) (where the representation [x ... y] means all values between and including x to, but not including, y). The color for all colors within this box is defined by the color at Y(8), I(72), P(−4).

If the index value of each color in the look-up table is K, and K varies between 0 to 255, then each and every color is defined by three numbers: $Y_K$, $I_K$, $P_K$.

The color table shown in FIG. 2 contains the three values—$R_K$, $G_K$, $B_K$—of each color as loaded into a display board 25 adapted to be plugged into a personal computer, workstation, or other system having the capability of displaying up to 256 colors simultaneously. The conversion from $Y_K$, $I_K$, $P_K$ to $R_K$, $G_K$, $B_K$ is carried out by inverting the R, B, G conversion matrix defined above. Since conversion to the R, G, B color space from the Y, U, V or Y, I, Q color space is a simple and well know mathematical operation, the color table shown in FIG. 2 can be easily converted to such other color spaces.

The table starts at index K=20 and continues up to K=255, since in most existing systems upto the first 20 colors are used by the system itself (in the conversion process all indices from 0 to 19 are mapped in black).

THE ERROR DIFFUSION PROCESS

The process described above is an algorithm applied to an image before being displayed through the color look-up table.

Each pixel in the image, its format notwithstanding, is converted to the Y.I.P. format, as described above.

The calculated values are truncated so as to be associated with a value included in the previously defined box, which yields the pixel values $Y_P$, $I_P$, $P_P$.

In order to find a color that best represents the three values above, each value passes through three linear quantizers as shown in Table I.

TABLE I

| Y QUANTIZER | | |
| --- | --- | --- |
| Yp range | $Y_K$ | 4-bit index |
| [0 ... 16) | 8 | 0000 |
| [16 ... 32) | 24 | 0001 |
| [32 ... 48) | 40 | 0010 |
| [48 ... 64) | 56 | 0011 |
| [64 ... 80) | 72 | 0100 |
| [80 ... 96) | 88 | 0101 |
| [96 ... 112) | 104 | 0110 |
| [112 ... 128) | 120 | 0111 |
| [128 ... 144) | 136 | 1000 |
| [144 ... 160) | 152 | 1001 |
| [160 ... 176) | 168 | 1010 |
| [176 ... 192) | 184 | 1011 |
| [192 ... 208) | 200 | 1100 |
| [208 ... 224) | 216 | 1101 |
| [224 ... 240) | 232 | 1110 |
| [240, 256) | 248 | 1111 |
| I QUANTIZER | | |
| Ip range | $I_K$ | 2-bit index |
| [−96, −48) | −72 | 00 |
| [−48, 0) | −24 | 01 |
| [0, 48) | +24 | 10 |
| [48, 96) | +72 | 11 |
| P QUANTIZER | | |
| Pp range | $P_K$ | 2-bit index |
| [−16, 8) | −4 | 00 |
| [8, 32) | +20 | 01 |
| [32, 56) | +44 | 10 |
| [56, 80) | +68 | 11 |

The 4 bits from the Y quantizer are concatenated with the 2 bits from the I quantizer and the 2 bits from the P quantizer to yield and 8 bit value for K. The selected K index represents the number of the small box that contains the $Y_P$, $I_P$, $P_P$ color.

The passing through the linear quantizers causes an error in each of the components defined as follows:

$Error_{13}Y = Y_P - Y_K$
$Error_{13}I = I_P - I_K$
$Error_{13}P = P_P - P_K$

In order to achieve the best display results for the human eye, the method takes the error into account and, in the tri-dimensional case (moving pictures), part of the error in each component is distributed among the pixels that are in the vicinity of the one in question and the corresponding pixel in the next frame.

TRI-DIMENSIONAL ERROR DIFFUSION

In the tri-dimensional case (moving pictures) the error is distributed among the neighboring pixels in the current image, and onto the corresponding pixel in the next frame.

Figure 4:
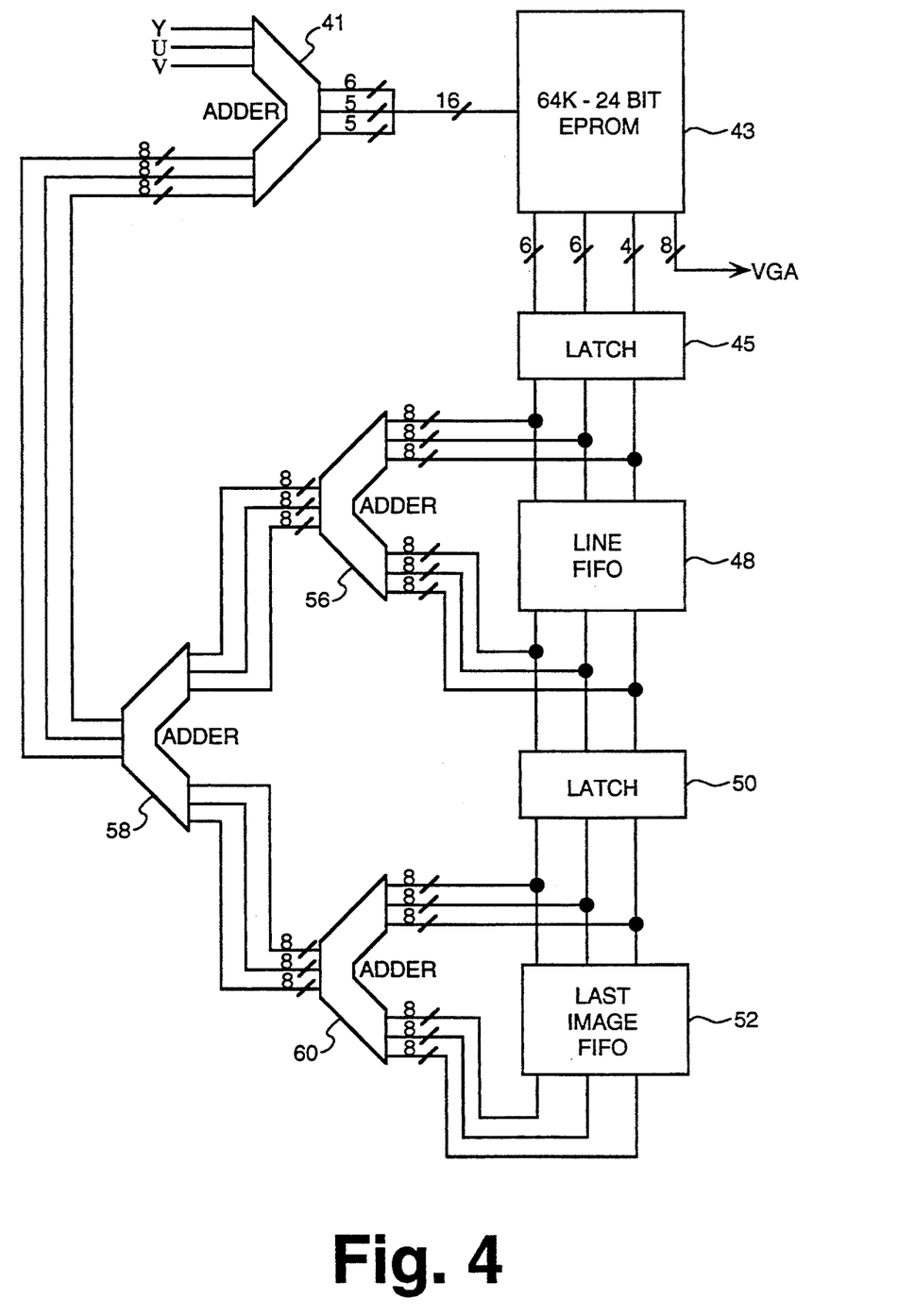
FIG. 4 is a diagram of an implementation for the tri-dimensional visual model in real time.

In the tri-dimensional case, the error is distributed among the nearby pixels, as shown in FIG. 4 where E represents the error for each of the three color components of the pixel (i.e., $Error_{13}Y$, $Error\_I$ and $Error_{13}P$) determined by taking the difference between the true color ($Y_P$, $I_P$ and $P_P$)and the pseudo color obtained using the color palette. The distribution for the three neighboring pixels is carried out for each component such that one-quarter of the error for each component is added to the three components of the pixel to the right. One eighth of the error for each component is added to the three components of the pixel below and the three components of the pixel to the latter's right. One half the error for each component is added to the corresponding pixel in the next frame.

The portion of the error passed onto the neighboring pixel's components are translated into their color space. The new image is created by the system scanning the original image sequentially, pixel by pixel and line after line. The "corrected" pixels, that is, those that carry the error passed by previous pixels are themselves subjected to the same process at a corresponding stage where their subsequent pixels are processed.

As a result of the error diffusion process, the image looks to the human eye to have a higher resolution, notwithstanding that the screen displays 256 colors only. Passing part of the error onto the next frame, specifically, one-half, also brings about an effect whereby the pixel color from one frame to the other changes gradually. To the human eye there is an impression of seeing the same color as in the original true-color frame.

By using the present invention, it is possible to display a high quality, full motion video (25 or 30 frames per second) in a full size window (352×240 pixels) over a standard AT bus which can transfer data at upto 2.4 MBytes per second. This is possible with the present invention because each pixel is represented by one 8 bit byte and 352×240×30×1=2.4 MBytes (for 30 frames per second). Since the prior art requires at least 16 bits per pixel for a high quality display, a bus capable of transferring at least 4.8 MBytes per second would be necessary.

FIG. 4 is a block diagram of a circuit for implementing the tri-dimensional visual model in real time. It comprises adder 41, EPROM 43, latch 45, line FIFO 48, latch 50, last image FIFO 52 and adders 56, 58, and 60. It should be noted that although only one of each of the foregoing elements shown, there exists three of each of the elements except for EPROM 43, one for each color component in the Y, U, V color space. (It should be noted that changes for use in other color spaces would be readily apparent to persons skilled in the art since other commonly utilized color spaces, such as R, G, B, are obtained from the Y, U, V color space by simple and well known mathematical relationships.) The pixel values are input to adder 41 along with errors from the previous pixels from adder 58, if any. The sum for each of the Y, U and V components is obtained and the 6 most significant bits of the Y component along with the 5 most significant U and V components are combined to form a 16 bit address used to access EPROM 43. Although the error for each component could be calculated for the full 8 bits of each component as described above, in one embodiment of the invention, a look-up table stored in EPROM 43 is used instead. The reason only 16 bits from adder 41 are utilized is that the full 24 bits would require a much larger EPROM (i.e., $2^{24} \times 24$ bits instead of $2^{16} \times 24$ bits) to store all possible results. Further, it has been determined that the least significant 2 bits from the Y component, 3 bits from the U component and 2 bits from the V component do not add significantly to the displayed image which can be seen by the human eye. The look-up table simply stores the colors from the universal palette, the Y component error, the U component error and the V component error for all possible combinations for the 16 bit values calculated in advance and stored in the EPROM. The output from the EPROM, i.e., the 24 bit word addressed by the 16 bit output of adder 41 is the V error component divided by 2 (6 bits), the U error component (6 bits), the Y error component (4 bits) and the VGA output (8 bits) for that pixel. The three error components are latched by latch 45, with O's added as the least significant bits to provide a full 8 bits per error component, the output of which is the error from the previous pixel and is a first input to adder 56 and FIFO 48. FIFO 48 is a variable length FIFO whose length depends upon the image width such that its output is the error from the pixel above the current pixel. This output is latched by latch 50 whose output is the error from the pixel at the upper left diagonal of the current pixel and is a second input to adder 56. These two inputs to adder 56 are added together by adder 56 whose output is one input to adder 58. The output of adder 58 is the total error to be added to the current pixel. The latched output of FIFO 48 is one input to adder 60, and is also input to last image FIFO 52 which stores the line in the prior frame corresponding to the line of the current frame for the current pixel. Last image FIFO 52 is a variable length FIFO whose length depends upon the image width such that its output is the error from the pixel in the prior frame corresponding to the current pixel. The output of latch 50 is one input to adder 60 whose second input is the output of FIFO 52. The sum formed by adder 60 is the second input to adder 58.

It should be noted that the circuit of FIG. 4 performs the error diffusion on the pixels above, to the left, to the above left and in the prior frame of the current pixel rather than to the right, below, below right and next frame as discussed above. However, it should be apparent that the results are exactly the same. Further, the error diffusion discussion above assumed the R, G, B color space and not the Y, U, V color space. However, since the R, G, B color space can be converted to the Y, U, V color space by a simple mathematical operation, the circuit of FIG. 4 can be easily adapted to operate on the R, G, B color space by adding a multiplier prior to the adder 41 which converts R, G, B to Y, U, V, the details of which would be apparent to persons skilled in the art.

I claim:

1. A system for displaying on a video display a plurality of frames of a pseudo color image formed from a true color image made of plurality of pixels using a 256 color palette, said plurality of frames being displayed on said video display sequentially so as to produce a displayed image which has apparent movement, said system comprising:
    (a) means for converting the true color image to the pseudo color image pixel by pixel, using said 256 color palette;
    (b) means for determining an error value for each color component of a current pixel between its true color value and the pseudo color value;
    (c) means for adding a first predetermined portion of said error value to the pseudo color values of predetermined pixels adjacent to said current pixel to produce a modified pseudo color image;
    (d) means for adding a second predetermined portion of said error value to the pseudo color values of corresponding pixels in a frame adjacent to a current frame to produce a modified pseudo color image;
    (e) means for displaying said pseudo color image as modified by said first and second added predetermined portions of said error value;
    wherein said 256 color palette is formed from a color space designated Y.I.P. which is determined according to the following matrix operation:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

wherein said R, G and B represent a red, blue, green color space.

2. The system as defined by claim 1 wherein said first and second predetermined portions of said error value are added such that one quarter of the error value is added to one pixel adjacent to the current pixel; one eighth of the error value is added to a second pixel adjacent to the current pixel, and one eighth of the error value is added to a third pixel adjacent to the current pixel, and one half the error value is added to a pixel in the frame adjacent to the current frame at a position corresponding to the position of the current pixel in the current frame.

3. The system defined by claim 2 wherein said 256 color palette is defined by a table of values in a RGB color space over an index K ranging from K=20 to K=255, said table of values being:

| K = 20 ... 78 | | | K = 79 ... 137 | | | K = 138 ... 196 | | | K = 197 ... 255 | | |
|---|---|---|---|---|---|---|---|---|---|---|---|
| R | G | B | R | G | B | R | G | B | R | G | B |
| 18 | 33 | 56 | 129 | 41 | 61 | 172 | 120 | 147 | 215 | 199 | 232 |
| 39 | 23 | 56 | 82 | 102 | 141 | 193 | 109 | 147 | 236 | 188 | 232 |
| 60 | 12 | 56 | 103 | 91 | 141 | 130 | 137 | 126 | 255 | 177 | 232 |
| 81 | 1 | 56 | 124 | 80 | 141 | 151 | 126 | 126 | 194 | 205 | 211 |

-continued

| K = 20...78 | | | K = 79...137 | | | K = 138...196 | | | K = 197...255 | | |
|---|---|---|---|---|---|---|---|---|---|---|---|
| R | G | B | R | G | B | R | G | B | R | G | B |
| 18 | 29 | 35 | 145 | 69 | 141 | 172 | 116 | 126 | 215 | 195 | 211 |
| 39 | 19 | 35 | 82 | 97 | 120 | 193 | 105 | 126 | 236 | 184 | 211 |
| 60 | 8 | 35 | 103 | 87 | 120 | 146 | 166 | 205 | 255 | 173 | 211 |
| 81 | 0 | 35 | 124 | 76 | 120 | 167 | 155 | 205 | 194 | 201 | 190 |
| 18 | 25 | 13 | 145 | 65 | 120 | 188 | 144 | 205 | 215 | 190 | 190 |
| 39 | 14 | 13 | 82 | 93 | 99 | 209 | 133 | 205 | 236 | 180 | 190 |
| 60 | 4 | 13 | 103 | 83 | 99 | 146 | 161 | 184 | 255 | 169 | 190 |
| 81 | 0 | 13 | 124 | 72 | 99 | 167 | 151 | 184 | 210 | 230 | 255 |
| 34 | 54 | 93 | 145 | 61 | 99 | 188 | 140 | 184 | 231 | 219 | 255 |
| 55 | 43 | 93 | 82 | 89 | 77 | 209 | 129 | 184 | 252 | 208 | 255 |
| 76 | 32 | 93 | 103 | 78 | 77 | 146 | 157 | 163 | 255 | 197 | 255 |
| 97 | 21 | 93 | 124 | 68 | 77 | 167 | 147 | 163 | 210 | 225 | 248 |
| 34 | 49 | 72 | 145 | 57 | 77 | 188 | 136 | 163 | 231 | 215 | 248 |
| 55 | 39 | 72 | 98 | 118 | 157 | 209 | 125 | 163 | 252 | 204 | 248 |
| 76 | 28 | 72 | 119 | 107 | 157 | 146 | 153 | 142 | 255 | 193 | 248 |
| 97 | 17 | 72 | 140 | 96 | 157 | 167 | 142 | 142 | 210 | 221 | 227 |
| 34 | 45 | 51 | 161 | 85 | 157 | 188 | 132 | 142 | 231 | 211 | 227 |
| 55 | 35 | 51 | 98 | 113 | 136 | 209 | 121 | 142 | 252 | 200 | 227 |
| 76 | 24 | 51 | 119 | 103 | 136 | 162 | 182 | 221 | 255 | 189 | 227 |
| 97 | 13 | 51 | 140 | 92 | 136 | 183 | 171 | 221 | 210 | 217 | 206 |
| 34 | 41 | 29 | 161 | 81 | 136 | 204 | 160 | 221 | 231 | 206 | 206 |
| 55 | 30 | 29 | 98 | 109 | 115 | 225 | 149 | 221 | 252 | 196 | 206 |
| 76 | 20 | 29 | 119 | 99 | 115 | 162 | 177 | 200 | 255 | 185 | 206 |
| 97 | 9 | 29 | 140 | 88 | 115 | 183 | 167 | 200 | 226 | 246 | 255 |
| 50 | 70 | 109 | 161 | 77 | 115 | 204 | 156 | 200 | 247 | 235 | 255 |
| 71 | 59 | 109 | 98 | 105 | 93 | 225 | 145 | 200 | 255 | 224 | 255 |
| 92 | 48 | 109 | 119 | 94 | 93 | 162 | 173 | 179 | 255 | 213 | 255 |
| 113 | 37 | 109 | 140 | 84 | 93 | 183 | 163 | 179 | 226 | 241 | 255 |
| 50 | 65 | 88 | 161 | 73 | 93 | 204 | 152 | 179 | 247 | 231 | 255 |
| 71 | 55 | 88 | 114 | 134 | 173 | 225 | 141 | 179 | 255 | 220 | 255 |
| 92 | 44 | 88 | 135 | 123 | 173 | 162 | 169 | 158 | 255 | 209 | 255 |
| 113 | 33 | 88 | 156 | 112 | 173 | 183 | 158 | 158 | 226 | 237 | 243 |
| 50 | 61 | 67 | 177 | 101 | 173 | 204 | 148 | 158 | 247 | 227 | 243 |
| 71 | 51 | 67 | 114 | 129 | 152 | 225 | 137 | 158 | 255 | 216 | 243 |
| 92 | 40 | 67 | 135 | 119 | 152 | 178 | 198 | 237 | 255 | 205 | 243 |
| 113 | 29 | 67 | 156 | 108 | 152 | 199 | 187 | 237 | 226 | 233 | 222 |
| 50 | 57 | 45 | 177 | 97 | 152 | 220 | 176 | 237 | 247 | 222 | 222 |
| 71 | 46 | 45 | 114 | 125 | 131 | 241 | 165 | 237 | 255 | 212 | 222 |
| 92 | 36 | 45 | 135 | 115 | 131 | 178 | 193 | 216 | 255 | 201 | 222 |
| 113 | 25 | 45 | 156 | 104 | 131 | 199 | 183 | 216 | 242 | 255 | 255 |
| 66 | 86 | 125 | 177 | 93 | 131 | 220 | 172 | 216 | 255 | 251 | 255 |
| 87 | 75 | 125 | 114 | 121 | 109 | 241 | 161 | 216 | 255 | 240 | 255 |
| 108 | 64 | 125 | 135 | 110 | 109 | 178 | 189 | 195 | 255 | 229 | 255 |
| 129 | 53 | 125 | 156 | 100 | 110 | 199 | 179 | 195 | 242 | 255 | 255 |
| 66 | 81 | 104 | 177 | 89 | 110 | 220 | 168 | 195 | 255 | 247 | 255 |
| 87 | 71 | 104 | 130 | 150 | 189 | 241 | 157 | 195 | 255 | 236 | 255 |
| 108 | 60 | 104 | 151 | 139 | 189 | 178 | 185 | 174 | 255 | 225 | 255 |
| 129 | 49 | 104 | 172 | 128 | 189 | 199 | 174 | 174 | 242 | 253 | 255 |
| 66 | 77 | 83 | 193 | 117 | 189 | 220 | 164 | 174 | 255 | 243 | 255 |
| 87 | 67 | 83 | 130 | 145 | 168 | 241 | 153 | 174 | 255 | 232 | 255 |
| 108 | 56 | 83 | 151 | 135 | 168 | 194 | 214 | 253 | 255 | 221 | 255 |
| 129 | 45 | 83 | 172 | 124 | 168 | 215 | 203 | 253 | 242 | 249 | 238 |
| 66 | 73 | 61 | 193 | 113 | 168 | 236 | 192 | 253 | 255 | 238 | 238 |
| 87 | 62 | 61 | 130 | 141 | 147 | 255 | 181 | 253 | 255 | 228 | 238 |
| 108 | 52 | 61 | 151 | 131 | 147 | 194 | 209 | 232 | 255 | 217 | 238. |

4. A method for displaying on a video display a pseudo color image formed from a true color image made of plurality of pixels using 256 color palette comprising the steps of:
   a) converting the true color image to the pseudo color image pixel by pixel, using said 256 color palette;
   b) determining an error value for each color component of a current pixel between its true color value and pseudo color value;
   c) adding a first predetermined portion of said error value to the pseudo color values of predetermined pixels adjacent to said current pixel to produce a modified pseudo color image;
   d) adding a second predetermined portion of said error value to the pseudo color values of corresponding pixels in a frame adjacent to a current frame to produce a modified pseudo color image;
   e) displaying said pseudo color image as modified by said added first and second predetermined portions of said error value;

wherein said 256 color palette is formed from a color space designated Y.I.P. which is determined according to the following matrix operation:

$$\begin{bmatrix} Y \\ I \\ P \end{bmatrix} = \begin{bmatrix} 0.299 & 0.587 & 0.114 \\ 0.596 & -0.274 & -0.322 \\ 0.211 & -0.253 & 0.312 \end{bmatrix} * \begin{bmatrix} R \\ G \\ B \end{bmatrix}$$

wherein said R, G and B represent a red, blue, green color space.

5. The method defined by claim 4 wherein said first and second predetermined portions of said error value are added such that one quarter of the error value is added to one pixel adjacent to the current pixel; one eighth of the error value is added to a second pixel adjacent to the current pixel, and one eighth of the error value is added to a third pixel adjacent to the current pixel, and one half the error value is added to a pixel in the frame adjacent to the current frame at a position corresponding to the position of the current pixel in the current frame.

6. The method defined by claim 4 wherein for an index K ranging from 20 to 255, said 256 color palette is defined by a table having values within the RGB color space such that for an index K ranging from K=20 to K=255 the corresponding RGB values are:

| K = 20...78 | | | K = 79...137 | | | K = 138...196 | | | K = 197...255 | | |
|---|---|---|---|---|---|---|---|---|---|---|---|
| R | G | B | R | G | B | R | G | B | R | G | B |
| 18 | 33 | 56 | 129 | 41 | 61 | 172 | 120 | 147 | 215 | 199 | 232 |
| 39 | 23 | 56 | 82 | 102 | 141 | 193 | 109 | 147 | 236 | 188 | 232 |
| 60 | 12 | 56 | 103 | 91 | 141 | 130 | 137 | 126 | 255 | 177 | 232 |
| 81 | 1 | 56 | 124 | 80 | 141 | 151 | 126 | 126 | 194 | 205 | 211 |
| 18 | 29 | 35 | 145 | 69 | 141 | 172 | 116 | 126 | 215 | 195 | 211 |
| 39 | 19 | 35 | 82 | 97 | 120 | 193 | 105 | 126 | 236 | 184 | 211 |
| 60 | 8 | 35 | 103 | 87 | 120 | 146 | 166 | 205 | 255 | 173 | 211 |
| 81 | 0 | 35 | 124 | 76 | 120 | 167 | 155 | 205 | 194 | 201 | 190 |
| 18 | 25 | 13 | 145 | 65 | 120 | 188 | 144 | 205 | 215 | 190 | 190 |
| 39 | 14 | 13 | 82 | 93 | 99 | 209 | 133 | 205 | 236 | 180 | 190 |
| 60 | 4 | 13 | 103 | 83 | 99 | 146 | 161 | 184 | 255 | 169 | 190 |
| 81 | 0 | 13 | 124 | 72 | 99 | 167 | 151 | 184 | 210 | 230 | 255 |
| 34 | 54 | 93 | 145 | 61 | 99 | 188 | 140 | 184 | 231 | 219 | 255 |
| 55 | 43 | 93 | 82 | 89 | 77 | 209 | 129 | 184 | 252 | 208 | 255 |
| 76 | 32 | 93 | 103 | 78 | 77 | 146 | 157 | 163 | 255 | 197 | 255 |
| 97 | 21 | 93 | 124 | 68 | 77 | 167 | 147 | 163 | 210 | 225 | 248 |
| 34 | 49 | 72 | 145 | 57 | 77 | 188 | 136 | 163 | 231 | 215 | 248 |
| 55 | 39 | 72 | 98 | 118 | 157 | 209 | 125 | 163 | 252 | 204 | 248 |
| 76 | 28 | 72 | 119 | 107 | 157 | 146 | 153 | 142 | 255 | 193 | 248 |
| 97 | 17 | 72 | 140 | 96 | 157 | 167 | 142 | 142 | 210 | 221 | 227 |
| 34 | 45 | 51 | 161 | 85 | 157 | 188 | 132 | 142 | 231 | 211 | 227 |
| 55 | 35 | 51 | 98 | 113 | 136 | 209 | 121 | 142 | 252 | 200 | 227 |
| 76 | 24 | 51 | 119 | 103 | 136 | 162 | 182 | 221 | 255 | 189 | 227 |
| 97 | 13 | 51 | 140 | 92 | 136 | 183 | 171 | 221 | 210 | 217 | 206 |
| 34 | 41 | 29 | 161 | 81 | 136 | 204 | 160 | 221 | 231 | 206 | 206 |
| 55 | 30 | 29 | 98 | 109 | 115 | 225 | 149 | 221 | 252 | 196 | 206 |
| 76 | 20 | 29 | 119 | 99 | 115 | 162 | 177 | 200 | 255 | 185 | 206 |
| 97 | 9 | 29 | 140 | 88 | 115 | 183 | 167 | 200 | 226 | 246 | 255 |
| 50 | 70 | 109 | 161 | 77 | 115 | 204 | 156 | 200 | 247 | 235 | 255 |
| 71 | 59 | 109 | 98 | 105 | 93 | 225 | 145 | 200 | 255 | 224 | 255 |
| 92 | 48 | 109 | 119 | 94 | 93 | 162 | 173 | 179 | 255 | 213 | 255 |
| 113 | 37 | 109 | 140 | 84 | 93 | 183 | 163 | 179 | 226 | 241 | 255 |
| 50 | 65 | 88 | 161 | 73 | 93 | 204 | 152 | 179 | 247 | 231 | 255 |
| 71 | 55 | 88 | 114 | 134 | 173 | 225 | 141 | 179 | 255 | 220 | 255 |
| 92 | 44 | 88 | 135 | 123 | 173 | 162 | 169 | 158 | 255 | 209 | 255 |
| 113 | 33 | 88 | 156 | 112 | 173 | 183 | 158 | 158 | 226 | 237 | 243 |
| 50 | 61 | 67 | 177 | 101 | 173 | 204 | 148 | 158 | 247 | 227 | 243 |
| 71 | 51 | 67 | 114 | 129 | 152 | 225 | 137 | 158 | 255 | 216 | 243 |
| 92 | 40 | 67 | 135 | 119 | 152 | 178 | 198 | 237 | 255 | 205 | 243 |
| 113 | 29 | 67 | 156 | 108 | 152 | 199 | 187 | 237 | 226 | 233 | 222 |
| 50 | 57 | 45 | 177 | 97 | 152 | 220 | 176 | 237 | 247 | 222 | 222 |
| 71 | 46 | 45 | 114 | 125 | 131 | 241 | 165 | 237 | 255 | 212 | 222 |
| 92 | 36 | 45 | 135 | 115 | 131 | 178 | 193 | 216 | 255 | 201 | 222 |
| 113 | 25 | 45 | 156 | 104 | 131 | 199 | 183 | 216 | 242 | 255 | 255 |
| 66 | 86 | 125 | 177 | 93 | 131 | 220 | 172 | 216 | 255 | 251 | 255 |
| 87 | 75 | 125 | 114 | 121 | 109 | 241 | 161 | 216 | 255 | 240 | 255 |
| 108 | 64 | 125 | 135 | 110 | 109 | 178 | 189 | 195 | 255 | 229 | 255 |
| 129 | 53 | 125 | 156 | 100 | 110 | 199 | 179 | 195 | 242 | 255 | 255 |
| 66 | 81 | 104 | 177 | 89 | 110 | 220 | 168 | 195 | 255 | 247 | 255 |
| 87 | 71 | 104 | 130 | 150 | 189 | 241 | 157 | 195 | 255 | 236 | 255 |
| 108 | 60 | 104 | 151 | 139 | 189 | 178 | 185 | 174 | 255 | 225 | 255 |
| 129 | 49 | 104 | 172 | 128 | 189 | 199 | 174 | 174 | 242 | 253 | 255 |
| 66 | 77 | 83 | 193 | 117 | 189 | 220 | 164 | 174 | 255 | 243 | 255 |
| 87 | 67 | 83 | 130 | 145 | 168 | 241 | 153 | 174 | 255 | 232 | 255 |
| 108 | 56 | 83 | 151 | 135 | 168 | 194 | 214 | 253 | 255 | 221 | 255 |
| 129 | 45 | 83 | 172 | 124 | 168 | 215 | 203 | 253 | 242 | 249 | 238 |
| 66 | 73 | 61 | 193 | 113 | 168 | 236 | 192 | 253 | 255 | 238 | 238 |
| 87 | 62 | 61 | 130 | 141 | 147 | 255 | 181 | 253 | 255 | 228 | 238 |
| 108 | 56 | 61 | 151 | 131 | 147 | 194 | 209 | 232 | 255 | 217 | 238. |

* * * * *

UNITED STATES PATENT AND TRADEMARK OFFICE
CERTIFICATE OF CORRECTION

PATENT NO.  : 5,450,098
DATED       : September 12, 1995
INVENTOR(S) : Oz

It is certified that error appears in the above-identified patent and that said Letters Patent is hereby corrected as shown below:

ON THE TITLE PAGE:

[22] Filed:    change "Sep. 19, 1992" to
               --March 19, 1992--.

Signed and Sealed this

Twentieth Day of February, 1996

Attest:

Attesting Officer

BRUCE LEHMAN
Commissioner of Patents and Trademarks